Nov. 22, 1949     C. H. FAY ET AL     2,489,126

AUTOMATIC VOLUME CONTROL FOR SEISMOGRAPH SYSTEMS

Filed Jan. 27, 1948     2 Sheets-Sheet 1

Inventors: Charles H. Fay
Thorwald J. Tvedt
By their Attorney

Nov. 22, 1949 C. H. FAY ET AL 2,489,126
AUTOMATIC VOLUME CONTROL FOR SEISMOGRAPH SYSTEMS
Filed Jan. 27, 1948 2 Sheets-Sheet 2

Inventors: Charles H. Fay
Thorwald J. Tvedt
By their Attorney

Patented Nov. 22, 1949

2,489,126

UNITED STATES PATENT OFFICE 2,489,126

AUTOMATIC VOLUME CONTROL FOR SEISMOGRAPH SYSTEMS

Charles H. Fay and Thorwald J. Tvedt, Houston, Tex., assignors to Shell Development Company, San Francisco, Calif., a corporation of Delaware Application January 27, 1948, Serial No. 4,656

5 Claims. (Cl. 179—171)

This invention pertains to seismic exploration, and relates more specifically to an automatic volume control system for maintaining a recording seismograph at a proper sensitivity or amplitude level.

In a seismic exploration, the energy of artificially generated ground or water pressure or velocity waves is transformed into electric signals or impulses and these impulses are recorded, with suitable amplification, in the form of seismogram traces.

The impulses produced by a detector in response to seismic waves differ very greatly from each other in intensity during the time of recording of a seismogram. It is therefore necessary to compensate for the disproportion in the magnitude of said impulses by varying the sensitivity of the amplifiers used between the detectors and the recorder in such a manner as to obtain recorded oscillations of a controlled amplitude permitting of a ready interpretation of the seismograph record.

In so-called AVC or automatic volume control systems, this is usually achieved by varying the grid bias of the amplifier or amplifier stages as a function of the intensity of the impulses or signals arriving thereto from the detectors.

This method of control has however the disadvantage that the degree of amplification of each individual impulse is affected by the intensity of the preceding impulse or impulses, which leads to a distortion of the relative amplitude values of the oscillations as compared between traces recorded on the seismograph.

Since it is generally desired to maintain said oscillations at a predetermined amplitude level, the arrival of extremely strong impulses produces especially undesirable effects on the operation of automatic control systems.

A very strong impulse arriving at an automatically controlled amplifier depresses its sensitivity to such an extent that its rate of recovery is not adequate to permit it to handle subsequent weaker impulses with a suitable amplification gain. This produces an effect known as squeezing, whereby oscillations occurring a few tenths of a second after a strong impulse, such as the initial impulse, as received by seismometers close to the shot point, are recorded with abnormally low amplification, and the relative amplitude values of some of these oscillations, as compared between traces, are even sometimes actually reversed.

On the other hand, the recovery rate of the amplifier control system cannot be increased beyond a certain point, since such increase would bring about a reduction of the desired amplitude contrast between successive portions of a given trace at such time when impulses of intermediate or low intensity are being recorded.

It is therefore an object of this invention to provide a seismic recording system wherein the volume or amplitude of the oscillations being recorded is controlled through a primary delay circuit and a parallel rapid recovery circuit, said rapid recovery circuit remaining normally inoperative and being operatively energized only upon an abrupt decay of the amplifier sensitivity and output level.

It is also an object of this invention to provide a seismic recording system wherein automatic volume control is achieved by applying to the grids of the amplifier tubes a negative bias current derived from a primary control and delay circuit, and providing a low-resistance path to ground for said negative bias current to permit a rapid recovery of the amplifier sensitivity after an abrupt decay of the amplifier output level.

It is also an object of this invention to provide an automatically controlled seismic recording system comprising one or more stages of thermionic tubes connected in push-pull, said stages being provided with circuit means, such as bleeder circuits and negative feed-back circuits, adapted to attenuate the intensity of spurious signals due to changes of amplifier grid bias, whereby these signals are substantially eliminated from the amplifier output.

These and other objects of the present invention will be understood from the following description taken with reference to the attached drawings, wherein.

Figure 1:
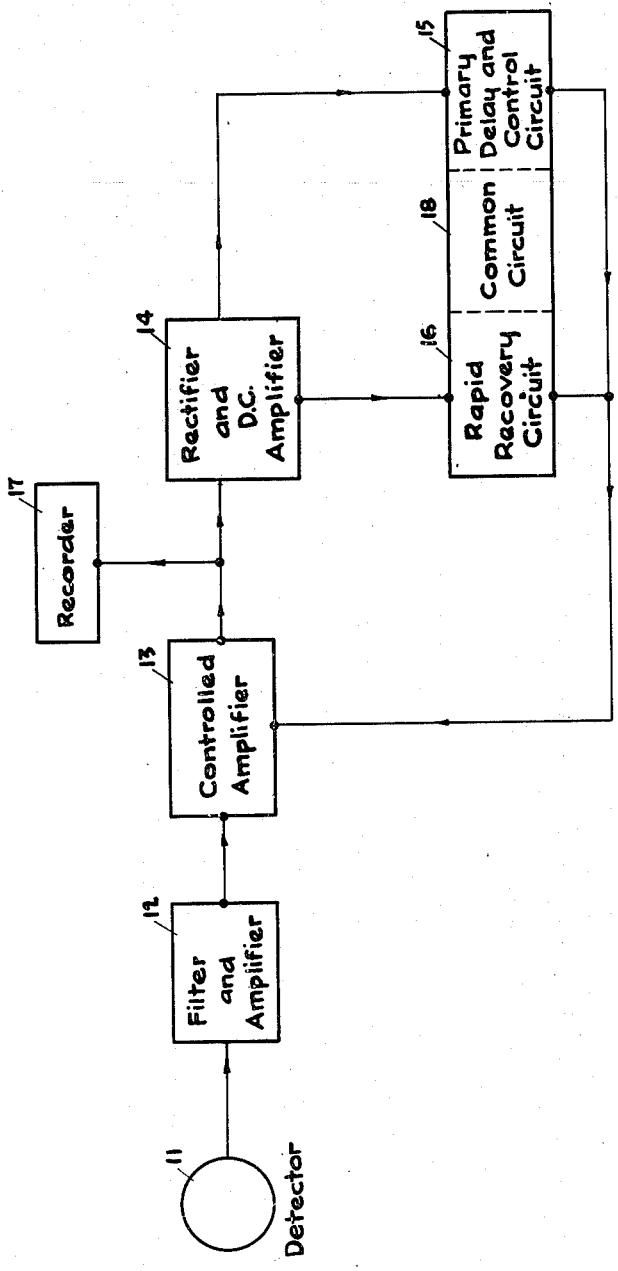
Fig. 1 is a schematic block diagram of the system of the present invention.
Figure 2:
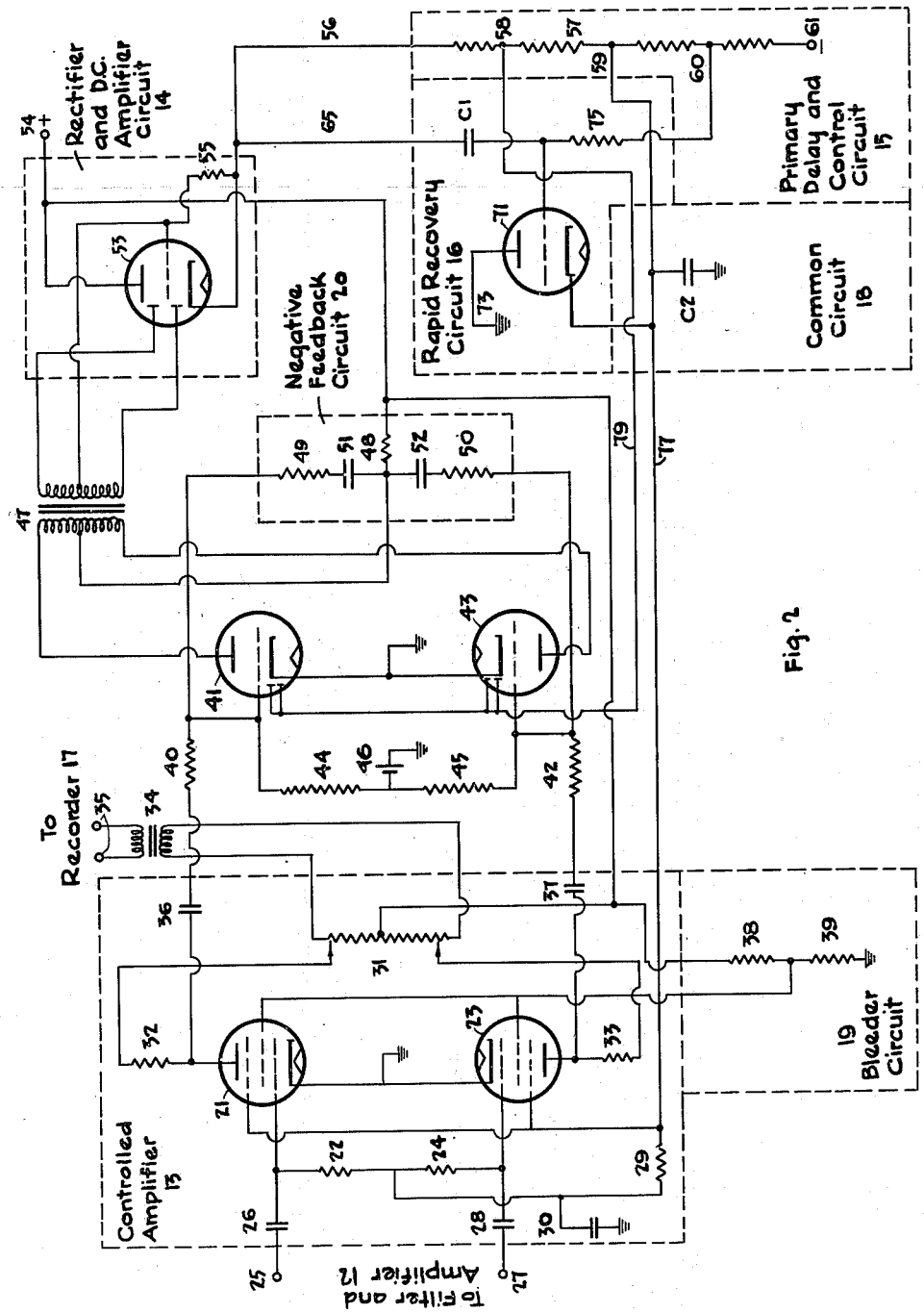
Fig. 2 is a circuit diagram showing the essential elements and connections of the system of the present invention.

Single detector and channel means are shown for simplicity in Figs. 1 and 2, it being understood that in actual seismic exploration a plurality of detectors and channels may be used in accordance with this invention in a manner understood by those familiar with the art.

Referring to Fig. 1, electric impulses produced by a detector or detectors 11 are transmitted through a filter and amplifier circuit 12 to a controlled amplifier 13.

The output of the controlled amplifier 13 is transmitted to a recorder 17 adapted to produce the desired seismograph record.

The output of the controlled amplifier 13 is also transmitted to a rectifier and D. C. amplifier 14, which transforms the alternating current output of amplifier 13 into a direct current, amplifies this direct current, and applies it, through a primary delay and control circuit 15, to the grid bias means of the controlled amplifier 13, thereby controlling the amplification gain of said amplifier 13, and thus the magnitude of the oscillations transmitted to the recorder 17.

The rectifier and D. C. amplifier 14 is also connected to the rapid recovery circuit 16, which has certain circuit elements in common with the primary delay and control circuit 15, as indicated at 18.

The rapid recovery circuit 16 is designed so that it remains normally inoperative, the control of the amplifier 13 being effected solely through the primary control circuit 15.

When, however, an exceedingly strong impulse from detector 11, after passing through the proper rectification and amplification stages, is applied by the primary control circuit to the controlled amplifier 13 in such a manner as to cause, at a high signal level, a very rapid attenuation or decay of the output of said amplifier 13, and the normal recovery rate of the primary control circuit is insufficient to check this decay, thereby depressing the sensitivity of the system to a level below normal for an undesirably long period, the rapid recovery circuit becomes operative and acts to remove the excessively large suppression or negative bias applied to the controlled amplifier, thus returning said amplifier to a normal operation.

The manner in which this is achieved will be best seen from the diagram of Fig. 2, which shows in detailed form only those elements of the circuits of Fig. 1 which are essential for the purposes of the present invention.

Fig. 2, wherein the circuits of Fig. 1 are indicated in dotted squares denoted by the same numerals as in Fig. 1, shows the controlled amplifier circuit 13 as comprising thermionic tubes 21 and 23, such as pentode tubes, connected in push-pull arrangement. Although only one push-pull stage is shown, two or more stages can conveniently be used instead, as will be understood by those familiar with the art.

The controlled amplifier stage 13 is energized by the output of the filter and amplifier circuit 12 of Fig. 1, the control grids of amplifier tubes 21 and 23 being coupled to said circuit 12 through condensers 26 and 28 and terminals 25 and 27.

A portion of the output of the push-pull amplifiers 21 and 23 is coupled, through a double Ayrton shunt 31 and output transformer 34 to the input terminals 35 of the recorder 17.

The screen grid voltage of tubes 21 and 23 is supplied by unbypassed common bleeder means comprising resistances 38 and 39 for purposes to be described hereinbelow.

The output of tubes 21 and 23 is also applied through capacitances 36 and 37 and resistors 40 and 42 to the grids of the triode sections of diode-triode tubes 41 and 43, likewise connected in push-pull arrangement. It is understood that instead of diode-triode tubes, an equivalent arrangement comprising rectifier tubes and separate triode tubes may equally well be used.

The grid bias for the triode sections of tubes 41 and 43 is supplied by bias battery 46 through grid resistors 44 and 45. It is understood that other bias means might equally well be employed.

The diode terminals of each of said tubes 41 and 43 are connected together to a point 58 in the primary control circuit 15, as will also be described hereinbelow.

The plate circuits of the tubes 41 and 43 feed the primary of a transformer 47 whose secondary is connected to the diode terminals of a diode-triode tube 53 forming part of the rectifier and D. C. amplifier circuit 14. Resistor 55 constitutes the load for the rectifier circuit. As in the case of tubes 41 and 43, separate rectifier and triode tubes may be used instead of a single tube 53, as will be understood by those familiar with the art. In the present specification, the terms diode and triode means are therefore used to define either separate diode and triode tubes, or the diode and triode sections of a multi-electrode tube.

Connected between a mid-point tap on the primary of transformer 47, the grids of tubes 41 and 43 and the plate supply terminal 54 is a negative feed-back circuit 20 comprising resistances 48, 49, and 50 and condensers 51 and 52.

The plate of the triode section of tube 53 is supplied with a suitable positive potential, such for example as 150 volts, from a positive terminal 54 of a suitable source of voltage, as are also the plates of other tubes shown in Fig. 2. In order not to complicate the diagram the leads required to supply cathode heater currents are omitted from Fig. 2, this matter being well understood in the art.

The cathode of the triode section of tube 53 is connected by lead 56 to the primary delay and control circuit 15, comprising a resistance 57 having taps 58, 59 and 60. Connected to the other end of resistance 57 at terminal 61 is a suitable source of negative potential such as −90 volts.

The cathode of tube 53 is also connected through a lead 65, parallel with lead 56, to the rapid recovery circuit 16.

The rapid recovery circuit of the present invention comprises a tube 71, which may be a triode tube or a pentode tube connected as a triode in such a manner that its suppressor and screen grids (not shown) are connected to the plate and the plate is grounded as shown at 73.

The control grid of tube 71 is connected to the lead 65 through a control condenser C1, and to a tap 60 on resistance 57 through a grid resistance 75.

The cathode of tube 71 is connected to a lead 77 extending between a tap or control point 59 on resistance 57 of the primary control circuit 15 and the control grids of amplifiers 21 and 23, to which it is connected through resistances 29, 22 and 24. The lead 77 is also connected to the suppressor grids of tubes 21 and 23. Condenser 30 and resistor 29 further filter and delay the change of control grid bias.

A second control condenser C2 has one of its plates grounded and the other plate connected to lead 77, this condenser being thus common to the primary control circuit and to the rapid recovery circuit.

The operation of the present control system is as follows:

During normal operation, that is, when no impulses of excessive intensity are delivered to the circuits of Fig. 2 from the detectors through the input terminals 25 and 27, the present system operates at a predetermined bias applied to the grids of controlled amplifier tubes 21 and 23 through lead 77, said bias depending on the potential at the selected control or tap point 59.

Automatic volume control is achieved by passing the A. C. output of tubes 21 and 23 through the stage comprising tubes 41 and 43, whose output is in turn delivered through transformer 47 to the tube 53 of the rectifier and D. C. amplifier circuit 14.

The A. C. impulses delivered by the transformer 47 are rectified to direct current by the diode section of tube 53, which direct current is applied as a negative bias from the mid-tap of the secondary of transformer 47, to the grid of the triode section of tube 53. This negative bias reduces the magnitude of the electronic flow from the cathode to the plate from its normal or quiescent value. The flow of current to the cathode of tube 53 through the resistance 57 determines the magnitude of the bias applied to the controlled amplifier tubes 21 and 23 through lead 77 and resistances 22 and 24.

The rapid recovery circuit tube 71 remains meanwhile completely inoperative, its grid having a sufficiently strong negative bias applied through resistance 75 to prevent any electronic flow from the cathode thereof to the plate and thence to the ground during normal operation.

When, however, an excessively strong impulse or signal is delivered by the detectors, this strong signal, rectified to D. C. by the diode section of tube 53, applies a sufficiently negative bias to the grid of the triode section to cut off the cathode to plate flow of said tube.

No or little current passing in such case to the cathode of tube 53 from terminal 61 through resistance 57, said terminal acts to apply a negative potential to said cathode and to both sides of control condenser C1. At the same time, it puts a negative charge on the control condenser C2 and applies a negative bias to the control grids of the controlled amplifier tubes 21 and 23, thus decreasing the amplification gain and the sensitivity of the system.

After the strong impulse has passed, the tube 53 becomes again rapidly conductive. However, the control condenser C2, which had become negatively charged when no current was passing through tube 53, remains so charged for a relatively longer time, since it has to discharge through high resistance branches of resistance 57. Condenser C2 continues therefore to maintain a negative bias on the controlled amplifiers 21 and 23, thus delaying the recovery of the system to a normal sensitivity throughout a critical period of time such for example as 0.2 second.

To eliminate this undesirable condition the present rapid recovery circuit is automatically brought into operation as follows:

As the tube 53 becomes again conductive, its cathode becomes positive, and so does that plate of condenser C1 connected thereto by lead 65. The condenser C1 thus applies a momentary positive bias to the grid of tube 71, said bias ultimately disappearing by the discharge of condenser C1 through resistances 75 and 57. This momentary positive bias makes tube 71 conductive to provide a path for a rapid discharge of the condenser C2 to the ground 73. The discharge of condenser C2 removes the high negative bias applied to the grids of controlled amplifier tubes 21 and 23 and permits a quick recovery of the normal sensitivity of the system.

In other words, the normal negative grid bias applied to the grid of the rapid recovery tube 71 is made of such value that for slow rates of increase of the cathode potential of tube 53, the grid of tube 71 is not made sufficiently positive to cause a plate current to flow in said tube. However, for large rates of increase of the cathode potential of tube 53 produced by a rapid decay of the signal at high input signal and suppression levels, the rapid recovery tube 71 passes a plate current, thereby permitting the control bias voltage of tubes 21 and 23 to become more positive at a rate much higher than that obtainable in the normal way through the primary delay and control circuit 15 alone. Since the plate to cathode voltage of tube 71 is the voltage at the control point 59 and therefore also the control bias voltage of tubes 21 and 23, the rapid recovery thus operates substantially only after a high negative bias has been applied to the controlled amplifiers to give large suppression, which is exactly the desired effect, for it is only for large suppression that a rapid or excessive decay of the signal level has to be prevented. The present rapid recovery system thus accomplishes the desired objective without introducing undesirably rapid control for signals of normal intensity and for normal portions of the seismogram produced by the recorder 17.

The normal or quiescent bias potential is made nearly independent of changes in the characteristic of D. C. amplifier tube 53 by the connection of the diodes of tubes 41 and 43 by means of lead 79 to the tap 58. It will be understood by those skilled in the art that if the potential of tap 58 were positive with respect to ground in the absence of this connection, the effect of the connection is to reduce the potential of tap 58 nearly to zero, the diodes drawing the current required to accomplish this. If, on the other hand, the potential of tap 58 were negative with regard to the ground in the absence of the connection, as will be the case when the system is controlling sufficiently large input signals, the connection would have no effect on the operation of the system. Neglecting contact potential effects, the diode plates can be thought of as an open circuit when their potential is negative with respect to their cathodes (in this case, ground), and as a low resistance path to the cathodes when their potential is positive with respect to their cathodes. As long as the current in tube 53 is sufficiently high to tend to make tap 58 positive, the diodes will draw sufficient current to keep tap 58 within a few tenths of a volt of ground potential, and hence keep tap 59 within a few tenths of a volt of a negative potential selected by the location on resistor 57 of tap 58.

In the absence of the diodes and the effect of grid currents in the controlled tubes, tap 59 would under quiescent conditions have a positive potential of some tens of volts. In the absence of a strong signal, condenser C2 discharges from an earlier negative bias condition as if it were approaching a positive potential of some tens of volts, until tap 58 reaches zero potential and the diodes begin to conduct. The further small slow increase in sensitivity due to a small further discharge of C2 is of little practical significance, so that it may be stated that this use of the diodes also permits a more rapid approach to maximum effective sensitivity.

In other words, the diode sections of tubes 41 and 43 serve in general as an open circuit for negative potentials and as a low resistance path to ground for positive potentials. In addition to fixing the quiescent bias potential at the desired value, by choice of the location of tap 58 on resistance 57, they permit a more rapid approach to maximum sensitivity than would be possible, for example, with the discharge of a condenser through a constant resistance.

As shown, the controlled push-pull amplifiers 21 and 23 are coupled to tubes 41 and 43 by resistance-capacitance means rather than by transformer means, which insures a good low-frequency response and permits considerable economy in the weight and volume of the equipment involved. This resistance-capacitance coupling transmits, however, not only the true signal from the detectors, and input terminals 25 and 27, which may be termed the push-pull signal, but also a spurious signal due to bias change applied to tubes 21 and 23 through lead 77, which may be termed the push-push signal. This push-push signal does naturally not appear in the output to the recorder, but would affect the control action of the present circuit if permitted to cause large changes in the bias, and consequently in the amplification gain of tubes 41 and 43.

The following means are therefore provided in the present system to degenerate the spurious push-push signal as compared with the true push-pull signal:

First, the screen grids of tubes 41 and 43 are provided with bleeders 38 and 39 of fairly large resistance, introducing screen degeneration for the push-push but not for the push-pull signals.

Second, there is provided a negative feedback circuit 20 (comprising resistances 48, 49 and 50 and condensers 51 and 52), which feeds back the push-push signal appearing across resistance 48 to the grids of tubes 41 and 43, thereby further degenerating the push-push signal.

As stated hereinbelow, the diagrams of Figs. 1 and 2 show only such circuit details of a seismic recording system as are necessary for understanding and practicing the present invention. It is therefore clear that the system of Fig. 1 may comprise various other conventional circuits, such as initial suppressors, noise level attenuators, interstage filters, paraphrase amplifiers, etc., which are commonly used for purposes of improved performance. The same applies with regard to Fig. 2, from which various conventional details, such, for example, as cathode heater circuits, auxiliary resistances and condensers, etc. have been omitted for the sake of clarity.

We claim as our invention:

1. An automatic volume control for seismic recording systems having detector means for producing electric signals, recorder means for recording said signals and amplifier means connected between said detector and said recorder means, said automatic volume control system comprising rectifier means energized by the output of said amplifier means, first triode means having a grid connected to the direct current output of said rectifier means, whereby the cathode to plate flow of said triode means is controlled by said direct current, a delay circuit comprising resistance means connected between the cathode of said triode means and the grids of said amplifier means, whereby the bias applied to said amplifiers is controlled by the cathode to plate flow of said triode means, a rapid recovery circuit comprising a first condenser connected in parallel with said delay circuit, a second condenser having one plate grounded and the other plate connected to a control point on the resistance means of the delay circuit, second triode means having its plate grounded, its cathode connected to said control point, and its grid connected to the cathode of said first triode means through said first condenser, and negative bias means connected between the grid of said second triode means and said control point, whereby said second triode means is maintained non-conductive during normal operation and is caused to permit flow therethrough upon a discharge of said first condenser following a rapid fall of the signal level and an attendant rapid rise of potential of the cathode of said first triode means, the flow through said second triode means providing a path for a rapid discharge of the second condenser and a rapid decrease of the negative bias applied to the amplifier grids.

2. An automatic volume control for seismic recording systems having detector means for producing electric signals, recorder means for recording said signals and amplifier means connected between said detector and said recorder means, said automatic volume control system comprising rectifier means energized by the output of said amplifier means, first triode means having a grid connected to the direct current output of said rectifier means, whereby the cathode to plate flow of said triode means is controlled by said direct current output, a delay circuit comprising a resistance connected to the cathode of said triode tube, a voltage control point on said resistance connected to the grids of said amplifiers, whereby the negative bias applied to said amplifiers is controlled as a function of the cathode potential of said triode means, a grounded condenser connected to said control point, second triode means having a plate grounded and a cathode connected to said control point, a condenser connected between the grid of the second triode means and the cathode of the first triode means, and negative bias means connected between the grid of the second triode means and said control point, whereby said second triode means is maintained non-conductive during normal operations, and is caused to conduct current from said control point to ground upon a discharge of the condenser connected to the grid thereof following a rapid fall of the amplified signal level and an attendant rapid rise of the cathode potential of the first triode means, the current flow through said second triode means providing a path for a rapid discharge to ground of the grounded condenser, and thereby causing a rapid decrease of the negative bias applied to the amplifier grids.

3. An automatic volume control for seismic recording systems having detector means for producing electric signals, recorder means for recording said signals and amplifier means connected between said detector and said recorder means, said automatic volume control system comprising rectifier means energized by the output of said amplifier means, first triode means, means for controlling the cathode to plate flow of said triode means by applying to the grid thereof a negative potential derived from the output of said rectifier means, a delay resistance connected at one end to the cathode of said triode means, a control point on said resistance connected to the grids of said amplifier means, a grounded condenser connected to said control point, a source of negative potential connected to the other end of said delay resistance, whereby a negative charge is placed on said grounded condenser and an increased negative bias is applied to said amplifier means when the cathode to plate flow of said triode means is substantially decreased upon the arrival thereto of a strong rectified signal, and means for permitting a rapid discharge of said grounded condenser to ground and a quick decrease of said negative amplifier bias, said means comprising second triode means having a cathode connected to said control point, a grounded plate, means comprising a condenser connecting the grid of said second triode means to the cathode of the first triode means in parallel with said resistance, and means negatively biasing said grid with regard to said control point, whereby said second triode means remain non-conductive during normal operation, and are rendered conductive by a discharge of the condenser connected to the grid thereof upon a rapid increase of the cathode to plate flow of said first triode means, the current flow through said second triode means providing a path for a rapid discharge to ground of the grounded condenser, and thereby causing a rapid decrease of the negative bias applied to the amplifier grids.

4. The system of claim 3 comprising at least two pentode amplifiers connected in push-pull, means connecting the control and the suppressor grids of said pentode amplifiers to said control point to apply a bias to said grids, and means for degenerating spurious signals due to grid bias changes, said means comprising grounded bleeder resistance means connected between the screen grid and the plate circuits of said pentodes.

5. The system of claim 3 comprising at least two pentode amplifiers connected in push-pull, means connecting the control and the suppressor grids of said pentode amplifiers to said control point to apply a bias to said grids, first means for degenerating spurious signals due to grid bias changes, said means comprising grounded bleeder resistance means connected between the screen grid and the plate circuits of said pentodes, at least two diode-triode thermionic tubes connected in push-pull to the output of said pentode amplifiers, transformer means connecting the plate output of said diode-triode tubes to the input of the rectifier means, and second means for degenerating said spurious signals, said second means comprising a negative feed-back circuit connected between the plate of the first triode means and the grids of said diode-triode tubes.

CHARLES H. FAY.
THORWALD J. TVEDT.

REFERENCES CITED

The following references are of record in the file of this patent:

UNITED STATES PATENTS

| Number | Name | Date |
| --- | --- | --- |
| 2,276,708 | Wyckoff | Mar. 17, 1942 |
| 2,316,354 | Mortiz, Jr. | Apr. 13, 1943 |
| 2,390,322 | Parr, Jr. | Dec. 4, 1945 |
| 2,404,160 | Boucke | July 16, 1946 |